United States Patent [19]

Lewis

[11] Patent Number: 4,830,259
[45] Date of Patent: May 16, 1989

[54] RADIATOR SUPPORT APPARATUS

[76] Inventor: Clarence Lewis, P.O. Box 71, Theodosia, Mo. 65761

[21] Appl. No.: 132,215

[22] Filed: Dec. 14, 1987

[51] Int. Cl.⁴ .............................................. B23K 37/04
[52] U.S. Cl. .......................................... 228/19; 29/726
[58] Field of Search ................... 29/726, 742; 228/19, 228/119, 264; 269/46

[56] References Cited

U.S. PATENT DOCUMENTS

| | | | |
|---|---|---|---|
| 909,934 | 1/1909 | Ray | 29/726 |
| 1,360,452 | 11/1920 | Sharpe . | |
| 1,410,410 | 3/1922 | Schulz . | |
| 1,764,021 | 6/1930 | Jackson . | |
| 1,999,003 | 4/1935 | Bushnell | 219/38 |
| 3,125,800 | 3/1964 | Klima | 29/726 |
| 3,149,825 | 9/1964 | Watkins | 263/2 |
| 3,673,384 | 6/1972 | Burman et al. | 219/230 |
| 4,128,235 | 12/1978 | Gersbacker | 29/726 |
| 4,371,106 | 2/1983 | Chapman | 228/19 |
| 4,391,027 | 7/1983 | Fleury | 29/726 |

*Primary Examiner*—M. Jordan

[57] ABSTRACT

A support apparatus for use during disassembly and reassembly of a vehicular radiator is provided. The support apparatus includes vertically adjustable and rotatable generally horizontal supports and rotatable supports. Adjustable heating elements provide for use of the support apparatus with various size radiators.

12 Claims, 2 Drawing Sheets

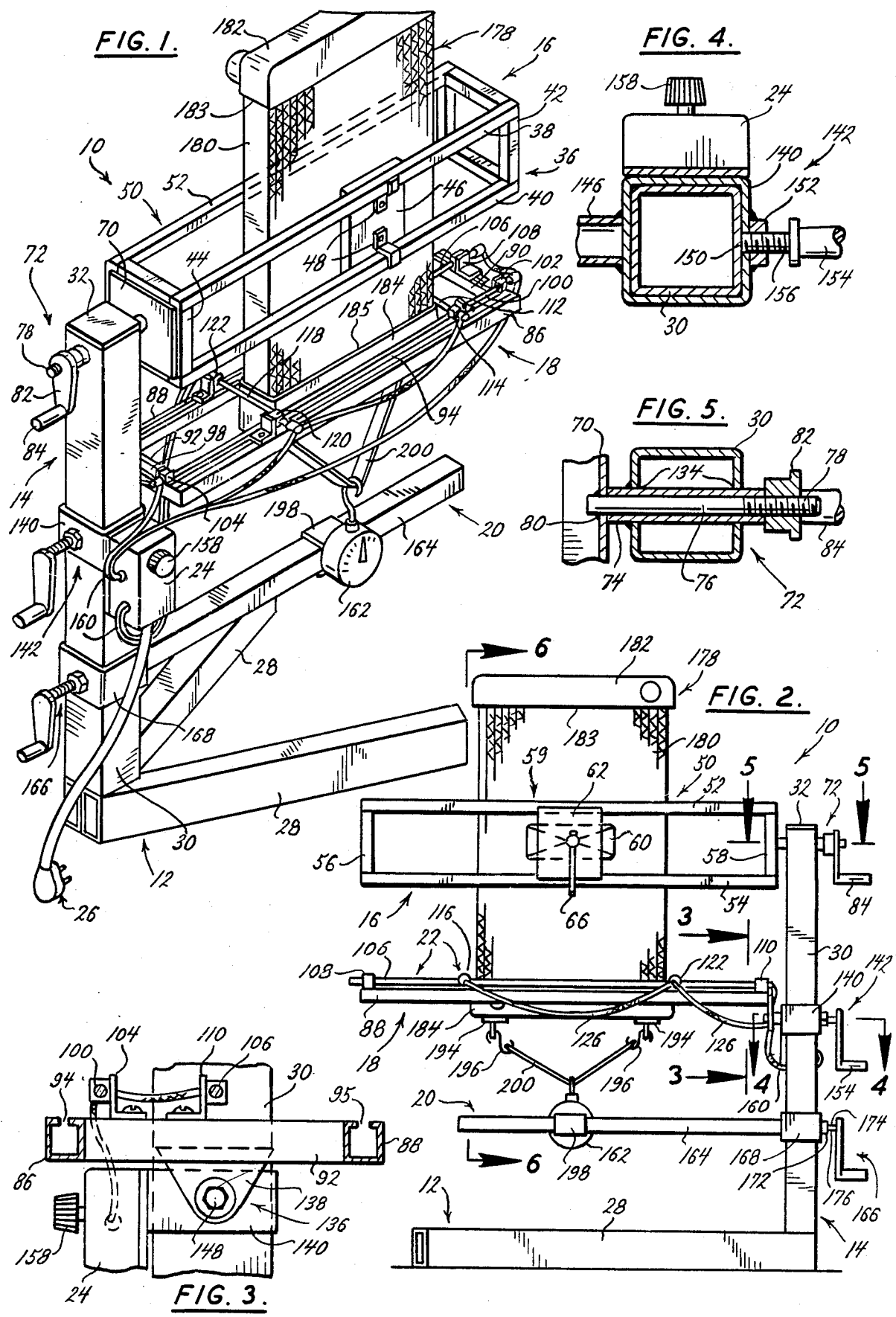

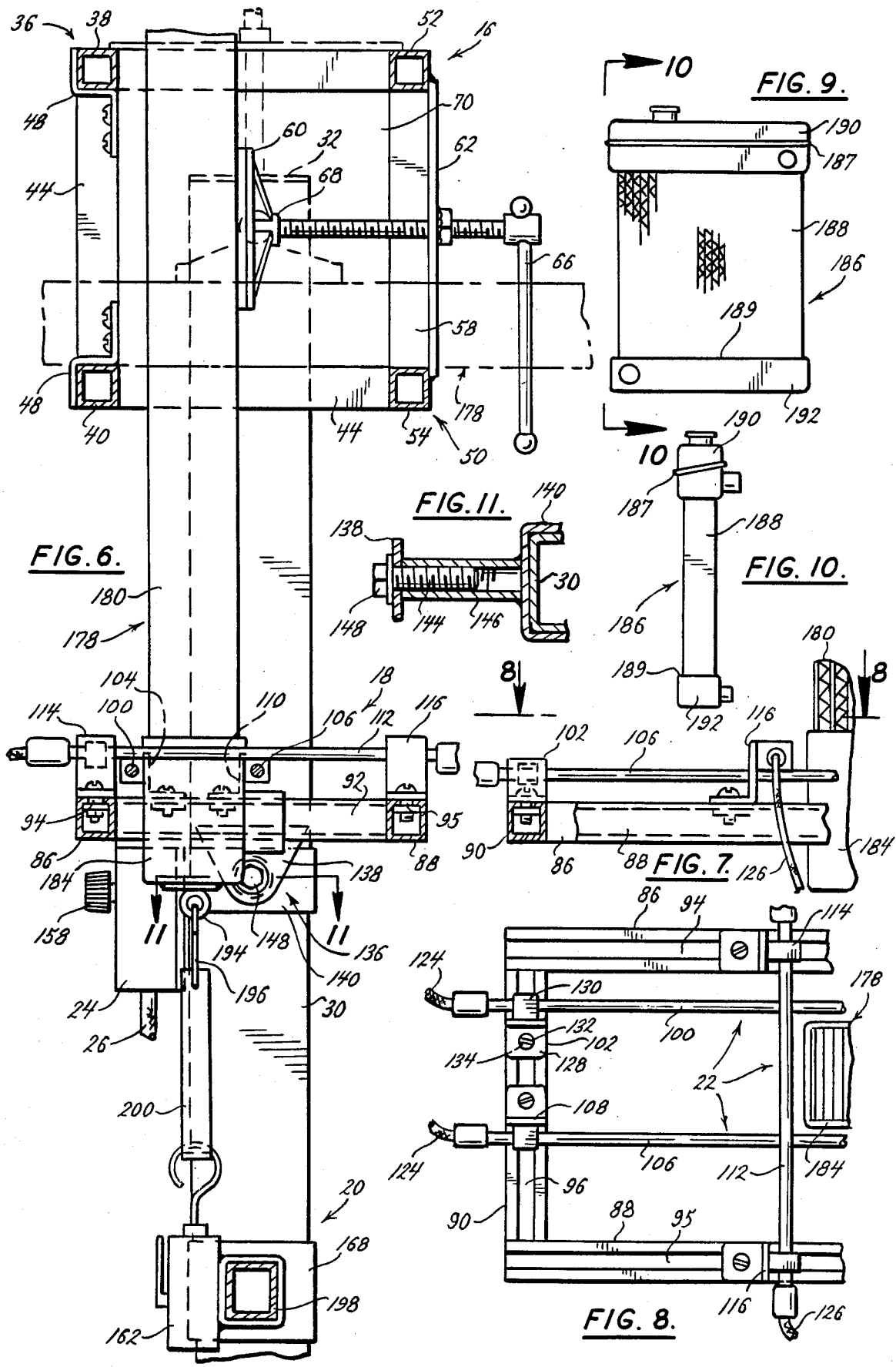

RADIATOR SUPPORT APPARATUS

BACKGROUND OF THE INVENTION

This invention relates generally to a support apparatus for a vehicular radiator and more particularly to a vehicular radiator support apparatus for use in conjunction with radiator repair including the disassembly and reassembly of the radiator.

A typical vehicle radiator includes a tube core section, an upper manifold and a lower manifold assembled with soldered connections to insure a desired pressure tightness. Repair of the radiator includes either the repair or replacement of the radiator core and typically requires the removal of the upper and the lower manifold sections from the tube core section. The tube core is then either repaired or replaced. The radiator is reassembled by replacing the removed or new (as required) upper manifold section and lower manifold section on the new or repaired tube core section. Re-soldering the connections completes the repair.

A patent issued to Chapman, U.S. Pat. No. 4,371,106, discloses a method for disassembling a radiator and a device for use with the method. The device includes a stand, a heating loop and a platform movably mounted to the stand. The platform is attached to the radiator to apply tension to solder joints of the radiator while the joints are heated with the heating loop. A patent issued to Watkins, U.S. Pat. No. 3,149,825 discloses a plurality of heating units located at the ends of adjustable arms for directing heat at selected parts of a radiator. A patent issued to Shulz, U.S. Pat. No. 1,410,410 discloses a radiator repair machine including a relatively complicated mechanism to re-solder fins to radiator core tubes.

These and other attempts have been made to provide a radiator support apparatus. However, to date the attempts to provide a suitable apparatus have failed for a number of reasons. Typically the apparatus presently available do not provide for use with different size radiators, allow for rotation of a radiator, or provide multiple positions of heaters and continuous heating of an entire soldered connection.

The radiator support apparatus of the present invention solves these and other problems in a manner not disclosed in the known prior art.

SUMMARY OF THE INVENTION

The support apparatus for a radiator of the present invention includes an apparatus support means and a radiator support means that rotatably supports the radiator. The apparatus support means includes at least one heater means for loosening a soldered radiator connection. A heater support means supports the heater means in operative relation to at least one of the soldered radiator connections. The heater support means and the radiator support means are both rotatable with respect to the radiator support apparatus. Tension means operatively associated with the radiator provides a separating force for facilitating the separation of the heated soldered radiator connections.

It is an aspect of this invention that the radiator support apparatus provide an apparatus that is simple and inexpensive to manufacture and use.

It is another aspect of this invention that the radiator support apparatus provides a heating means and heater support means that is readily accessible and adjustable for use with different size radiators.

It is another aspect of this invention that the radiator support apparatus provides a vise and swivel means for holding and rotating the radiator.

It is yet another aspect of the present invention that heating controls are provided for controlling the heating means.

These and other aspects and features of the present invention will be better understood and appreciated from the following detailed description of an embodiment thereof, selected for the purpose of illustration and shown in the accompanying drawings.

BRIEF DESCRIPTION OF THE DRAWINGS

FIG. 1 is a perspective of a radiator support apparatus;

FIG. 2 is an elevation of one embodiment of the present invention;

FIG. 3 is a section taken along line 3—3 of FIG. 2;

FIG. 4 is a section taken along line 4—4 of FIG. 2;

FIG. 5 is a section taken along line 5—5 of FIG. 2;

FIG. 6 is a section taken along line 6—6 of FIG. 2;

FIG. 7 is a partial elevation of a heater means and heater support means of the present invention;

FIG. 8 is a section taken along line 8—8 of FIG. 7;

FIG. 9 is an elevation of a typical radiator;

FIG. 10 is an elevation taken along line 10—10 of FIG. 9; and

FIG. 11 is a partial section taken along line 11—11 of FIG. 6.

DESCRIPTION OF A PREFERRED EMBODIMENT

Referring now by characters of reference to the drawings and first to FIG. 1 it will be understood that an apparatus support means, typically a radiator support apparatus generally indicated by reference character 10, is intended for use to support a radiator during disassembly and reassembly of the radiator. The radiator support apparatus 10 generally includes a substantially horizontal base member 12 and a substantially vertical apparatus support member 14 supported by the base member 12. A radiator support means, typically a radiator support member 16, is supported by the radiator support apparatus 10 for rotatably supporting a radiator. The radiator support apparatus further includes a heater support means, typically a heater support member 18, and a tension scale support member 20. The apparatus 10 further includes a plurality of heating means 22 for softening or melting solder and an output control means 24 for controlling the heating means. Power is provided to the output control 24 by a primary power cord 26 which includes a suitable connector for connection to a voltage source, such as a 220 volt voltage source (not shown).

The horizontal base member 12 includes a pair of longitudinal members 28 joined together at an acute angle. The longitudinal members 28 are preferably a pair of rectangular tube members welded to the bottom of apparatus support member 14. The support member 14 is preferably a square tubular member 30. A top plate 32 can be placed over the opening at the top of square tube 30. At the top of square tube 30 a pair of opposing apertures 34 are provided.

The radiator support member 16 further includes a plurality of opposing horizontal radiator support members 36 and 50 for providing support for opposing elements of a radiator vise 59. The one horizontal radiator support member 36 includes a first horizontal member 38 and a second horizontal member 40 parallel to and below member 38. A first vertical end member 42 and an opposing second vertical end member 44 connect members 38 and 40 to complete horizontal radiator support member 36.

Support member 36 supports a radiator vise fixed jaw 46 which is part of radiator vise 59. The fixed jaw 46 is typically supported by a pair of opposing S-shaped brackets 48 which support radiator vise fixed jaw 46 on the horizontal support member 36 while allowing fixed jaw 46 to slide along first and second horizontal members 38 and 40. This provides an adjustment means necessary for radiators of different sizes and shapes.

The opposing horizontal radiator support member 50 is typically formed by a third horizontal member 52 and a fourth horizontal member 54 connected at their ends by third vertical end member 56 and fourth vertical end member 58. The radiator vise 59 further includes a radiator vise movable jaw 60, a shaft receiving plate 62, a threaded shaft 65 including a handle 66 and a threaded shaft receiving member 68. The two sides of radiator vise 59 cooperate to removably hold a radiator in the radiator support member. Plate 62 can be connected to the horizontal radiator support member 50 in a fashion similar to that shown and described with respect to the fixed jaw 46 and the horizontal radiator support member 36. Thus, both the fixed jaw 46 and the plate 62 can be slidingly connected to the radiator support member 16. In the preferred embodiment the radiator vise 59 is fixed in a generally central position as shown on the drawings.

An end plate 70 on radiator support member 16 cooperates with a first swivel assembly 72 to provide for rotation of radiator support member 16.

As shown in FIG. 5 swivel assembly 72 includes a sleeve 74 that passes through and is welded to the edges of apertures 34. The sleeve receives a shaft 76. The shaft includes a threaded end 78 and an opposing end 80 welded to end plate 70. The threaded end 78 of shaft 76 receives a threaded locking nut 82 and a threaded end of a crank arm 84.

The heater support member 18 located below the radiator support member 16 is mounted on square tube 30 for generally vertical movement and includes one longitudinal heater support member and another opposing longitudinal heater support member, 86 and 88, respectively. The opposing longitudinal heater support members are joined by one transverse end connecting member 90 and another opposing transverse end connecting member 92. In order to increase the adjustability of the heater support member each longitudinal and transverse member includes a channel. One longitudinal channel 94 and another longitudinal channel 95 and one transverse channel 96 and another transverse channel 98 are shown in FIGS. 1, 3, 6, 7 and 8.

The preferred embodiment includes four independently adjustable electrical heating elements. One longitudinal heating element 100 is supported by a first movable support bracket 102 and a second movable support bracket 104 for transverse adjustment in transverse channels 96 and 98, respectively. Another longitudinal heating element 106 is supported by a third movable support bracket 108 and a fourth movable support bracket 110 in transverse channels 96 and 98, respectively, for transverse adjustment of heating element 106.

The apparatus includes two transverse heating elements included with the apparatus. One transverse heating element 112 is supported at opposing ends by a fifth movable support bracket 114 and a sixth movable support bracket 116 for longitudinal adjustment in opposing longitudinal channels 94 and 95, respectively. Another transverse heating element 118 is movably supported at opposing ends by a seventh movable support bracket 120 and an eighth movable support bracket 122 for longitudinal adjustment in opposing longitudinal channels 94, 95, respectively.

A longitudinal heating element power supply line 124 electrically connects the output control means 24, a rheostat in the preferred embodiment, and the longitudinal heating elements. Similarly, a transverse heating element power supply line 126 electrically connects the rheostat and the transverse heating elements.

Referring now to a typical movable support bracket 102, each movable support bracket generally includes an L-shaped base 128 and an associated insulated holding member 130 to hold the heating element while insulating the temperature of the heating element from the base 128. Typically, a threaded member 132 and nut 134 are provided to secure the support bracket in a desired position while allowing the support bracket to be loosened and secured in a new desired position.

The heater support member previously described is rotatable by means of a second swivel assembly 136 connected to swivel attachment plate 138 of heater support member 18. With reference to FIGS. 3, 4, 6 and 11 a bracket 140 is provided for vertical adjustment of heater support member 18. Bracket 140 slidably engages with square tube 30 and includes an adjustment assembly 142 for vertical movement of the heater support bracket 18.

The adjustment assembly 142 includes a rotatable support means for rotatably supporting the heater support means, which in a preferred embodiment includes a swivel pin or bolt 144 having one threaded end and a swivel assembly bolt head 148 on the end of swivel pin 144 and the pin threadably engaged with a thredded end of sleeve 146.

The apparatus provides for vertical movement of the assembly and heater support member 18 as will now be described. A bracket aperture 150 is provided in bracket 140. A nut 152 is welded to bracket 140 and provides a threaded passage to bracket aperture 150. A crank arm 154 includes a threaded portion 156 threadably received by nut 152. Loosening crank arm 154 allows movement of bracket 140 vertically on square tube 30. When bracket 140 is in position the threaded portion 156 is brought to bear on square tube 30 through aperture 150 by threadably engaging the threaded portion 156 with nut 152. This is accomplished by turning crank arm 154.

The output control rheostat 24 includes a heating element control knob 158 for adjusting the heat output of the heating elements. A plurality of power cables 160 electrically connect the output control box to the heating elements.

The tension scale support member 20 supports a tension means for disassembly of a radiator. In the preferred embodiment the tension scale support member slidingly supports a tension measuring means, typically a tension scale 162. The support member 20 is vertically adjustable on square tube 30 by means of adjustment assembly 166. Adjustable assembly 166 is substantially similar in operation to the heater support bracket adjustment assembly 142. Adjustment assembly 166 includes a bracket 168, a bracket aperture 170, a welded nut 172, a crank arm 174, and a threaded portion 176 associated with the crank arm 174.

A radiator 178 generally includes a tube core section 180 and an upper manifold section 182 having one soldered connection 183. A lower manifold section 184 is attached to the tube core section 180 with another soldered connection 185.

Radiator 186 in FIGS. 9 and 10 illustrates another style and includes a tube core section 188 and an upper manifold section 190 including an intermediate solder connection 187 and another solder connection 189 between the tube core section 188 and a lower manifold section 192.

The solder connection 187 is inclined at an angle. However, since both the radiator support member 16 and heater support member 18 are rotatable, the heating means can be applied as close as possible to the solder connection 187 by vertically and rotatably adjusting the heater support member 18 and rotatably adjusting the heater support member 16.

In order to apply tension to the the solder connections for disassembly of the radiator a pair of brackets 194 can be welded or temporarily connected to the lowest of the two manifold sections. A pair of S-clips 196 are placed through apertures in brackets 194 and a connecting member 200 runs between S-clips 196 and a connection to the tension scale 162. The amount of tension on the radiator can be measured as the soldered connection is heated to soften the solder. A scale bracket 198 is provided in order to move the tension scale 162 along adjustable support member 164 in order to accomodate different size and type radiators.

A typical operation at the preferred embodiment will no be described. A radiator work piece, for example, either radiator 178 or 186, is placed intermediate the radiator vise fixed jaws 46 and the radiator vise movable jaw 60 of the radiator vise 59. The radiator vise is tightened sufficiently to hold the radiator work piece. The radiator support member 16 is rotated as required by means of the first swivel assembly 72 in order to accomodate insertion of the radiator work piece intermediate the jaws of the radiator vise 59. The radiator support member 16 is then rotated to place the radiator work piece in either an upright or angled position suitable for the radiator.

The bracket 140 is loosened and the heater support member 18 is raised on the apparatus support member 14 to a desired position. The bracket 140 is tightened to hold the heater support member 18 at the desired position. Initially, the heater support member 18 is typically out of the way and placed relatively low on the apparatus support member 14 to allow easy placement of the radiator work piece in the radiator vise 59.

In the desired position the heater support member 18 positions the heating elements adjacent a soldered joint to be loosened. The heater support member 18 can be rotated with the second swivel assembly 136 in order to position the soldered joint of the radiator work piece in as close as possible and effective proximity to the electric heating elements.

Brackets 194 are connected as shown in FIGS. 2 and 6 to the lowest manifold section.

The transverse and longitudinal electric heating elements are adjusted by means of their respective movable support brackets in the respective transverse and longitudinal channels in order to place them within effective heating proximity to the soldered joint. The electric heating elements can be fixed in position by tightening the support brackets in their respective channels.

The scale bracket 198 is used to horizontally adjust the tension scale 162 along the adjustable support member 164 until the tension scale 162 is approximately centered below the radiator work piece and between the two (2) brackets 194. The connecting member 200 is secured at its ends to the brackets 194 and through a hook (as shown in FIGS. 1, 2 and 6) connected to the tension scale 162. The hook is directly connected to the tension measuring portion of the tension scale 162. A tension force is then applied to the hook and measured by the tension scale 162. The applied tension can be determined from the output mechanism, e.g., a dial scale and needle combination reading in pounds.

The adjustable support member 164 is adjusted on the apparatus support member 14 by means of the vertical adjustment bracket 168. The support member 164 is adjusted so as to apply a desired force, as indicated on the tension scale 162, on the radiator. A required amount of force or tension to be applied to the radiator can be determined by trial and error for different style radiators.

Once the electric heating elements are in position the power is turned on and the rheostat 24 is adjusted to energize the transverse and longitudinal heating elements until the solder in the solder joint adjacent the heating elements begins to soften. The heating elements uniformly raise the solder temperature. As the solder uniformly softens the soldered connection slowly separates and the manifold section separates from tube core.

It has been found through use of a prototype of the present invention that a typical General Motors automobile radiator with a tank seventeen (17) inches long and three (3) inches wide requires from eight (8) to ten (10) minutes to disassemble a soldered connection from a cold start once the radiator is in place in the radiator support apparatus. The heating elements are allowed to get red hot. While no temperature measurements have been made on the heating elements used on the prototype it is known that 40/60 solder (40% TM, 60% lead) will melt at 327° C. (621.3° F.) and this mixture is the one most commonly used in the automotive radiator industry. The prototype has been used by applying a typical tension of fifty (50) pounds.

The combination of the temperature of the heating elements and the tension on the bottom manifold section provides uniform separation of the soldered connection. The aspect of uniform heating results in the capability of the radiator support apparatus of the present invention to be used to uniformly soften and melt solder applied to a tube core/manifold joint during reassembly of the radiator. This can be accomplished, for example, by first cold forcing a manifold section and tube core section together and then placing the connection adjacent the adjustable heating elements as previously described. The heating elements are activated to raise the temperature of the metal at the connection above the melting temperature of the solder. Solder is applied to the hot metal, thereby melting the solder which then flows into the connection. Once the heating elements are turned off, the temperature of the metal at the connection lowers, the solder hardens and forms a uniform, pressure tight joint.

From the foregoing description those skilled in the art will appreciate that all of the aspects of the present invention are realized. A radiator support apparatus has been shown and described that is simple to use and simple and inexpensive to manufacture. An adjustable heating means has been provided. The radiator vise and swivel accomodate different size and shape radiators. The heating cnntrols allow a user to vary the temperature of the heater elements for use during either disassembly or reassembly of the radiator.

Other modifications may be made to the embodiment illustrated and described without departing from the spirit of the invention. For example, the support apparatus of the present invention could be modified by changing the orientation of support member 14 from vertical to horizontal. It is not intended that the scope of this invention be limited to a particular embodiment. Rather, the scope of the invention is to be determined by the following claims and their equivalents.

What I claim is:

1. A support apparatus for a radiator comprising:
   (a) an apparatus support means,
   (b) a radiator support means for rotatably supporting a radiator, the radiator support means supported by the apparatus support means,
   (c) adjustable heating means for softening or melting solder,
   (d) a heater support means for adjustably supporting the heating means, the heater support means slidingly adjustable vertically with respect to the apparatus support menns and independently of the radiator support means, the heater support means comprising at least one rigid, heater support member for sliding adjustable support of the heating means, and
   (e) a tension means for providing a separating pulling force for separating loosened soldered radiator connections.

2. The support apparatus of claim 1 in which:
   (f) the apparatus support means includss a substantially horizontal base member, and
   (g) the apparatus support means further includes a substantially vertical apparatus support member supported by the base member.

3. The support apparatus of claim 2 in which:
   (h) the substantially horizontal base member includes at least two longitudinal members joined together at an acute angle.

4. The support apparatus of claim 2 in which:
   (h) the substantially vertical apparatus support member includes a tubular member having a generally square cross-section.

5. The support apparatus of claim 1 in wiich:
   (f) the radiator support means includes a plurality of support members interconnected to form a framework,
   (g) a radiator vise supported by the framework for holding the radiator while the soldered radiator connections are heated and holding against the separating force of the tension means.

6. A support apparatus for a radiator comprising
   (a) an apparatus support means,
   (b) a radiator support means for rotatably supporting a radiator, the radiator support means supported by the apparatus support means,
   (c) adjustable heating means for softening or melting solder,
   (d) a heater support means for adjustably supporting the heating means,
   (e) a tension means for providing a separating force for separating loosened soldered radiator connections,
   (f) the radiator support means includes a plurality of support members interconnected to form a framework,
   (g) a radiator vice supported by the framework for holding the radiator while the soldered radiator connections are heated and holding against the separating force of the tension means, and
   (h) the radiator vise is movable with respect to the framework.

7. The support apparatus of claim 1 in which:
   (f) the adjustable haating means include electric heating elements.

8. The support apparatus of claim 1 further comprising:
   (f) means for controlling the output of the heating means.

9. The support apparatus of claim 1 in which:
   (f) the tension means includes a tension support means, the tension support means supported by the apparatus support means for movement relative to the apparatus support means, and
   (g) connecting means for connecting the tension means and the radiator.

10. A support apparatus for a radiator comprising
    (a) an apparatus support means,
    (b) a radiator support means for rotatably supporting a radiator, the radiator support means supported by the apparatus support means,
    (c) adjustable heating means for softening or melting solder,
    (d) a heater support means for adjustably supporting the heating means,
    (e) a tension means for providing a separating force for separating loosened soldered radiator connections,
    (f) the tension means includes a tension support means, the tension support means supported by the apparatus support means for movement relative to the apparatus support means,
    (g) connecting means for connecting the tension means and the radiator, and
    (h) a tension measuring means for measuring the tension applied to the radiator through the connecting means.

11. The support apparatus of claim 10 in which:
    (i) the tension measuring means includes a tension scale.

12. The support apparatus of claim 1 further comprising:
    (f) rotatable heater support means for rotatably supporting the heater support means.

* * * * *